Aug. 5, 1952  J. H. MEYER  2,606,012
FLOOR CHIPPING MACHINE
Filed April 9, 1949  2 SHEETS—SHEET 1
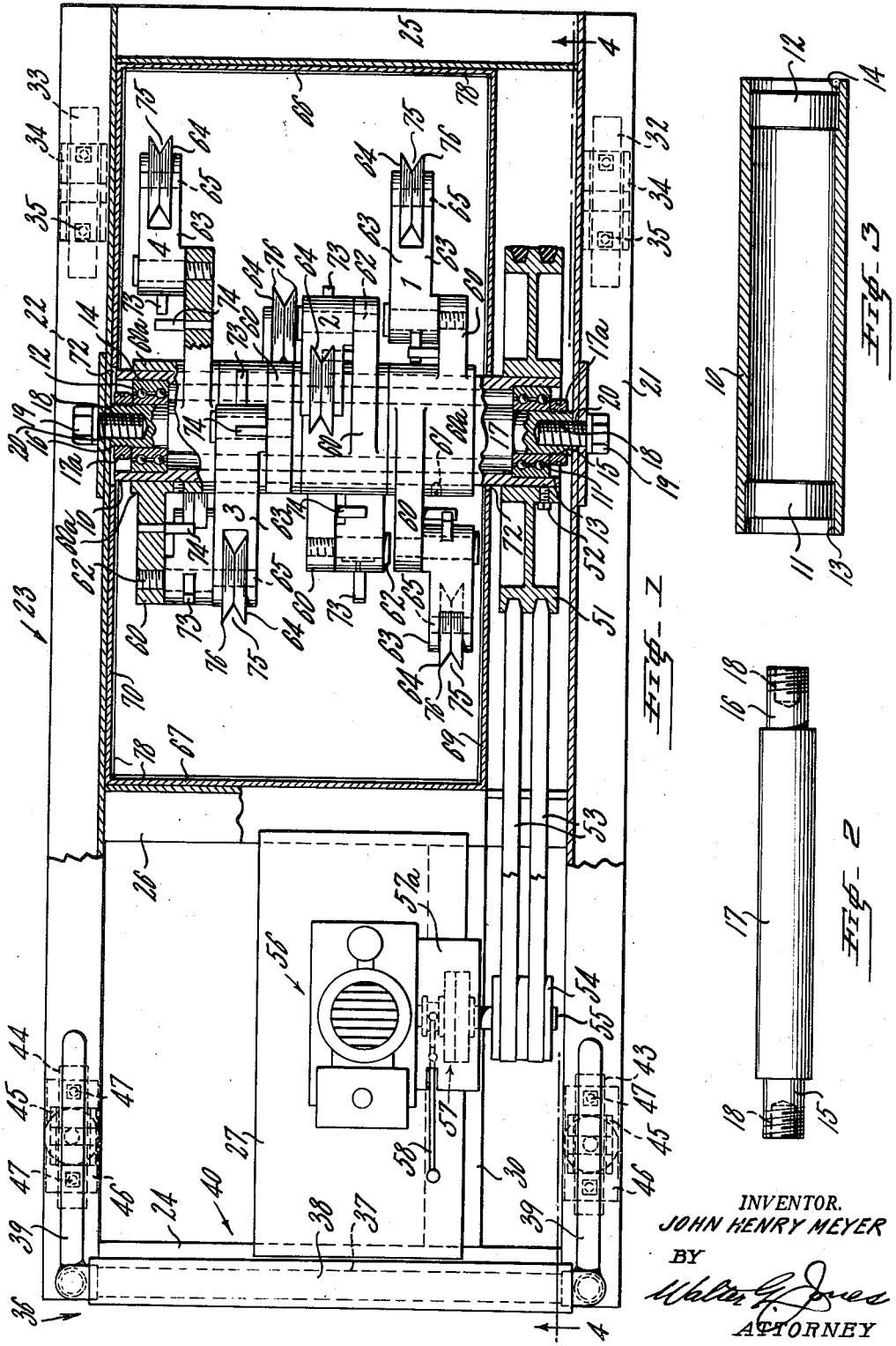
INVENTOR.
JOHN HENRY MEYER
BY
Walter G. Jones
ATTORNEY Aug. 5, 1952    J. H. MEYER    2,606,012
FLOOR CHIPPING MACHINE
Filed April 9, 1949    2 SHEETS—SHEET 2
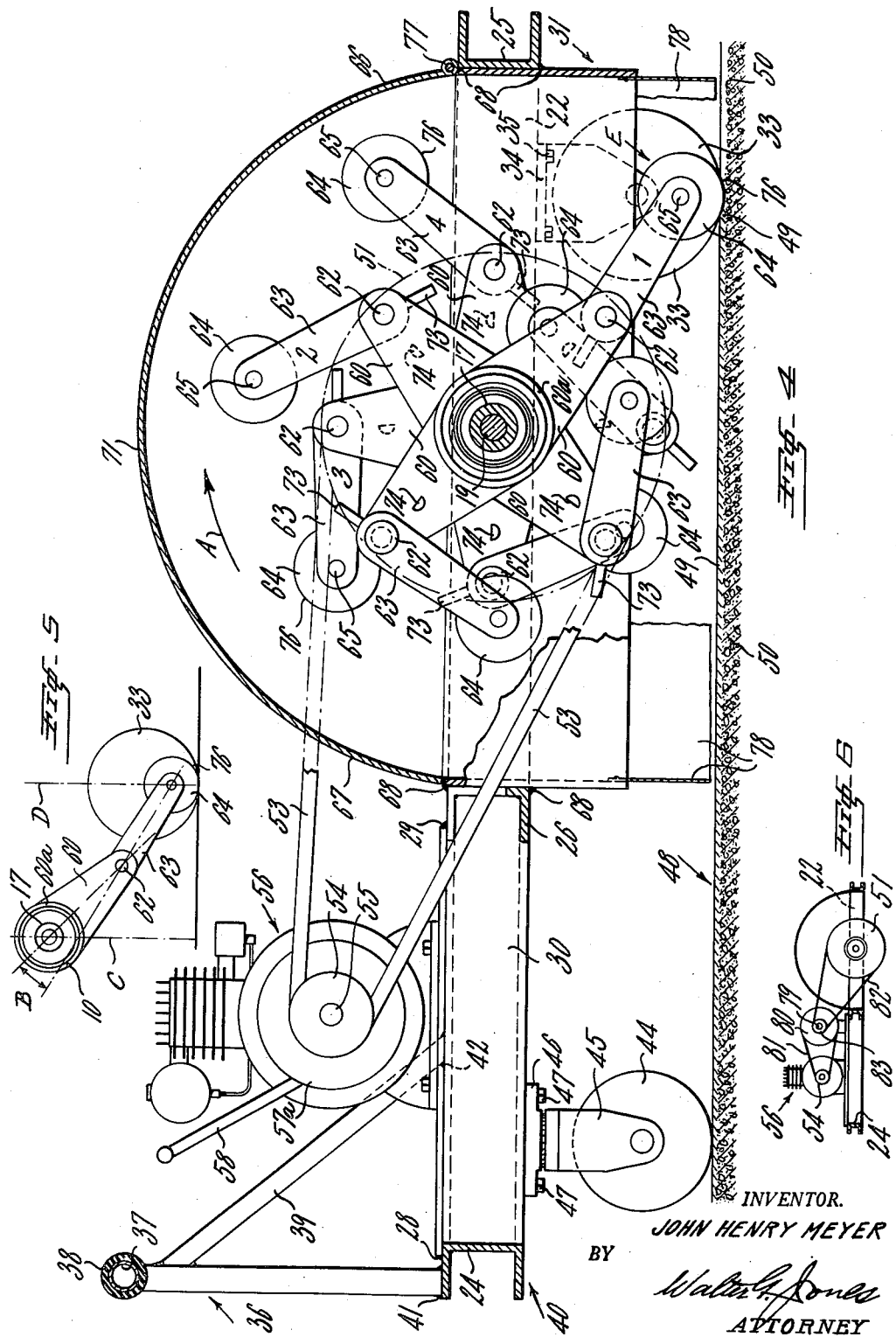
INVENTOR.
JOHN HENRY MEYER
BY
Walter G. Jones
ATTORNEY Patented Aug. 5, 1952

2,606,012

UNITED STATES PATENT OFFICE 2,606,012

FLOOR CHIPPING MACHINE

John Henry Meyer, Rutherford, N. J.

Application April 9, 1949, Serial No. 86,462

2 Claims. (Cl. 262—13)

My invention concerns a machine for chipping cement floors to prepare them for receiving a new cement surface.

It is a well known fact that the removal of an old cement surface from an underlying material of aggregates is an operation requiring considerable time and patience.

Heretofore many difficulties have been encountered in removing all of the old cement from the underlying material. If all of the cement is not removed it is impossible to obtain a proper bonding of the new cement to the underlying aggregates, and as a consequence the newly surfaced floor will not be satisfactory.

One of the objects of my invention is to simplify and speed the chipping operation while at the same time to insure complete removal of the old cement so that a 100% bond may be obtained by the new cement against the roughened material of the floor. In carrying out this object I provide a rotating series of chipping hammers mounted on a carriage which is moved over the floor. The hammers are arranged to strike the floor in rapid succession, one at a time, and at spaced points on the floor crosswise of the machine delivering downward blows against the cement surface. These downward intermittent and laterally distributed blows break up the cement layer quickly, shattering it loose from the underlying aggregates down deep into the surface. The loosened particles and dust may then be removed as by brushing prior to applying the new cement.

Another object is to provide a chipping machine which may be easily moved and directed from place to place over the floor surface, and requiring a minimum of power to operate.

A further object is to provide the hammers with striking heads which will automatically bring new striking edges into action as the machine progresses with its work. For this purpose I employ hardened wheels which rotate freely on their pivots to bring new portions of their peripheral edges in position to strike the floor surface.

A still further object of the invention is to reduce the cost of constructing a machine of this type by simplifying the parts and the assembling operations.

Various other objects and advantages will appear as the description proceeds.

In the accompanying drawings:

Fig. 1 is a plan view of the machine with parts broken away in section, the mechanism being shown as it is in operation.

Fig. 2 is a detail of a center shaft.

Fig. 3 is a detail of a rotatable sleeve.

Fig. 4 is a lengthwise section on the line 4—4 of Fig. 1 with a housing broken away and parts removed to show the hammers.

Fig. 5 is a diagram illustrating the angular position of the hammers as they strike the floor surface.

Fig. 6 shows another driving arrangement.

In the drawings the numeral 10 indicates a rotatable shaft or sleeve having ball races 11 and 12 at opposite ends which are set into recessed portions 13 and 14 of the sleeve and mounted upon the reduced threaded ends 15 and 16 of a central fixed shaft 17 extending through the sleeve 10. Locknuts 17a on the threaded ends 15 and 16 hold the ball races in place. The ends 15 and 16 of the shaft 17 are bored and threaded at 18 to receive bolts 19 which pass through openings 20 in the side frames 21 and 22 of a movable carriage 23 which may be constructed of channel irons. Cross frames 24 and 25 span the side frames at the ends of the carriage and may be welded, brazed, or otherwise secured in place. A short cross frame 26 may be installed intermediate the cross frames 24 and 25 to give added strength and to provide support for a mounting plate 27 welded in place as indicated at 28 and 29. A section of lengthwise frame 30 extending between cross frame 24 and cross frame 26 acts to further reinforce the framework of the carriage. The bolts 19 hold shaft 17 fixed.

At the front 31 of the machine a pair of wheels 32 and 33 are rotatable in bearing brackets 34 secured beneath the respective side frames 21 and 22 by bolts 35 or other appropriate fastening means.

A handle structure 36 having a cross bar 37, a rubber or other covering 38, and a brace 39 are secured to the rear part 40 of the carriage as by welding at 41 and 42.

Adjacent the rear of the machine there is also mounted a pair of wheels 43 and 44. These wheels have swivel mountings connecting the bearing brackets 45 to the attaching plates 46 which in turn are secured beneath sides 21 and 22 as by bolts 47. These front and back pairs of wheels provide steady, non-tilting mounting means for the superstructure of the carriage and enable it to be easily moved and directed over a floor surface 48 to be chipped, such as one having a cement topping 49 and underlying aggregates or foundation 50.

The rotatable sleeve 10 carries a large pulley 51 secured to the sleeve by a set screw 52, key, or other means, the pulley being shown in full lines in Fig. 1, but in dot-dash lines in Fig. 4 for clarity of illustration. The pulley 51 is driven in the direction of the arrow A by a belt or belts 53 from a small pulley 54 on the shaft 55 of a motor or engine 56. A suitable clutch 57 in the housing 57a of the engine is controlled by a lever 58 convenient to the operator of the machine, whereby power to rotate the sleeve 10 may be applied or released.

For breaking up the cement topping 49 there is carried upon the sleeve 10 a series of arms 60 spaced apart around the sleeve, in the present example, spaced at intervals of 45 degrees, providing eight radial arms. The arms may be in the form of units of two arms each extending opposite directions from a central collar 60a secured to the sleeve 10 as by a set screw 61. Pivot pins 62 secure the hammers 63 swingably to the eight ends of the arms. The hammers carry at their free ends hardened chipping wheels 64 which are pivoted for rotation on pins 65.

Upon rotation of the sleeve 10 the arms 60 move the hammers 63 around clockwise as viewed in Fig. 4, and the wheels 64 strike the cement topping 48, one after another, in downward blows between the front wheels 32 and 33 of the carriage. In this connection it is to be noted in Fig. 5 that the angularity B between the arm 60 and the hammer 63 is very slight when the hammer is in the act of striking the floor surface, the parts being arranged and proportioned so that two imaginary lines C, D, drawn vertically through the axes of sleeve 10 and wheel 64 are substantially spaced from each other, placing the striking area well forward of the axis of the sleeve. These downward blows drive the chipping wheels swiftly and deeply into the cement topping 49 and completely loosen it from the underlying foundation of aggregates.

The rotating parts are preferably encased in a housing having the rounded ends 66 and 67 secured to the cross frames 25 and 26 by welding at 68. Side plates 69 and 70 and the rounded dome 71 complete the housing which is open from end to end at the bottom and has appropriate openings for the sleeve 10 as indicated at 72.

Each of the hammers 63 may be equipt with a lug 73 adapted to contact a stop pin 74 on the associated arm 60 to prevent the hammers at the front end of the machine from hanging downward on their pivots when the machine is stopped.

During the chipping operation the hammers swing outward by the forces of rotation, and, as each hammer arrives at the location E on its downward drive at the front of the machine it has built up sufficient mass velocity to drive the chipping wheel well into the surface of the floor, by reason of the downward striking action imparted to the blow.

Preferably the chipping wheels 64 have a V-shaped profile 75 providing two chipping edges 76. This prevents rapid wear and gives better penetration.

In operation the sleeve 10 is put in rotation by applying power through the engine 56, and the carriage is then moved from place to place over the floor surface until the process of chipping is completed, after which a new layer of cement is applied to the exposed aggregates. It has been found that a speed of rotation of 300 to 500 revolutions per minute is satisfactory for most purposes. This gives 2400 to four thousand blows per minute to the chipping elements which operate to strike singly, one after another over a relatively wide pattern of floor surface between the ends of the rotating sleeve. The hammers usually are required to cut down into the surface of the floor to a depth of about one eighth of an inch which frees the cement, and cleans the surface of all foreign matter which would impair a bond of the new cement to the aggregates. It is to be noted that the hammers at the left of the machine are near the side frame 22, making it possible to work close to the walls of the room at that side of the machine.

The mechanism of the machine does not involve expensive manufacturing operations. The carriage consists mainly of ordinary channel irons welded together and reinforced by the transverse fixed shaft 17, while the rotating sleeve may be made of stock tubing internally machined at its opposite ends to provide recesses for the ball races 11 and 12. The radial arms and the hammers may be produced in any appropriate way, as by casting or forging, and are easy to finish by ordinary machine shop methods. Any type of clutch or drive may be used.

Preferably the housing is hinged as at 77, and curtains 78 are provided at the lower opening to prevent the flying of chips and dust.

In Fig. 6 a speed reducing arrangement employs a counter-shaft 79 having a pulley 80 driven by a belt 81 from the pulley 54. This in turn drives pulley 51 through belt 82 from the counter-shaft pulley 83, and may be used as a substitute for the other drive shown in Figs. 1 and 4.

The striking order of the hammers may be arranged as desired. For instance in the present example they are positioned around the sleeve to strike in the order 1, 4, 2, 3, and it has been found that with the parts proportioned substantially as shown the angle B is around 10 to 15 degrees which enables the hammers to deliver the downward blows required to work to the best advantage against the floor surface. It is also to be noted that the rebound of the hammers after striking the floor carries them upward toward the sleeve and that they pass around beneath the machine clear of the floor. It is seen in Fig. 4 that the arms 60 and the hammers 63 are of substantial length. This places the pivot 62 of the striking hammer near the floor and well forward of the axis of rotating sleeve 10. The chipping wheel 64 at the outer end of hammer number 1 is consequently considerably forward of the sleeve when it strikes the floor surface. It has been given a whipping action which drives the wheel into the surface in the form of a blow delivered practically at a right angle to the plane of the floor. The machine therefor strikes a series of vertical hammer blows in rapid succession as the sleeve rotates and whips the hammers, one after another, outward and downward at the forward end of the carriage.

Various modifications may be made within the scope of the appended claims.

I claim:

1. A floor chipping machine comprising a carriage including side frames, a shaft extending between the side frames and non-rotatively secured thereto by its opposite ends, a sleeve surrounding said shaft, bearings between said sleeve and said shaft providing rotatable mountings for the sleeve, radial arms carried by said sleeve, hammers pivoted to the ends of said arms, chipping means at the free ends of said hammers, and means for rotating said sleeve, said hammers being mounted to deliver blows singly, one after another, against the floor, the hammers being located at spaced positions laterally along said sleeve, each hammer acting in turn to strike the floor at a point spaced from the striking points of the other hammers crosswise of the machine, whereby the chipping means breaks up the floor surface at spaced points across the floor while the machine is moved lengthwise along the floor to bring new areas beneath the hammers, said arms and said hammers being of substantial length, the pivot of each succeeding hammer being relatively near the floor surface and substantially forward of the axis of the sleeve when the hammer is delivering its blow, said chipping means when striking the floor surface being considerably forward of said pivot by reason of the substantial length of the hammer and the nearness of its pivot to the floor surface, each succeeding hammer being given a downward whipping swing around its pivot and driving said chipping means at practically right angles against the floor surface, said chipping means comprising wheels having hardened cutting edges and rotatably mounted in the free ends of said hammers.

2. A floor chipping machine according to claim 1, provided with means adapted to prevent said hammers from hanging downward on their pivots at the working end of the carriage when the machine is stopped.

JOHN HENRY MEYER.

REFERENCES CITED

The following references are of record in the file of this patent:

UNITED STATES PATENTS

| Number | Name | Date |
|---|---|---|
| 1,518,505 | Gray | Dec. 9, 1924 |
| 1,701,912 | De Walt | Feb. 12, 1929 |
| 1,964,746 | Sloan | July 3, 1934 |
| 2,349,949 | Farrell | May 30, 1944 |
| 2,520,066 | Rush | Aug. 22, 1950 |

FOREIGN PATENTS

| Number | Country | Date |
|---|---|---|
| 530,654 | Germany | July 31, 1931 |